United States Patent [19]
Coldren

[11] 4,000,681
[45] Jan. 4, 1977

[54] MINE BOLT TENSION INDICATOR

[75] Inventor: Chester P. Coldren, Canton, Ohio

[73] Assignee: Eaton Corporation, Cleveland, Ohio

[22] Filed: May 12, 1975

[21] Appl. No.: 576,416

[52] U.S. Cl. .................................. 85/62; 85/87
[51] Int. Cl.$^2$ ............................... F16B 31/02
[58] Field of Search .............. 85/62; 73/88 F; 116/114 R, 114 H, DIG. 34

[56] References Cited
UNITED STATES PATENTS

| | | | |
|---|---|---|---|
| 1,020,748 | 3/1912 | Dobson | 85/62 |
| 2,725,843 | 12/1955 | Koski | 85/62 |
| 2,781,687 | 2/1957 | Knocke | 85/62 |
| 3,060,731 | 10/1962 | Adise | 85/62 |
| 3,072,093 | 1/1963 | Lanius | 85/62 |
| 3,104,645 | 9/1963 | Harrison | 85/62 |
| 3,161,174 | 12/1964 | Harrison | 85/62 |
| 3,179,082 | 4/1965 | McClean | 85/62 |
| 3,329,058 | 7/1967 | Cumming | 85/62 |

FOREIGN PATENTS OR APPLICATIONS

| | | | |
|---|---|---|---|
| 1,121,370 | 4/1960 | Germany | 85/62 |

*Primary Examiner*—Ramon S. Britts
*Attorney, Agent, or Firm*—Teagno & Toddy

[57] ABSTRACT

A mechanical device for visually indicating the tension in a monitored bolt or the like. The device will visually indicate if the monitored bolt is subject to greater than a predetermined maximum tension or is subject to less than a predetermined minimum acceptable tension. The device will also give visual indication, generally proportional to the tension in the monitored bolt, when the tension in the monitored bolt is at less than the predetermined maximum but more than the predetermined acceptable minimum. The device includes a spring washer, preferably a helical washer, which is inserted inbetween the head of the bolt and the surface or backing plate against which the head of the bolt will bear for substantially resilient compression therebetween. The washer is selected with a spring constant such that the washer will be substantially flattened between the bolt head and the plate only upon the application of a tension to the bolt exceeding the predetermined maximum. The washer includes a pivot member, preferably a pivot pin, which will move axially away from the plate as the washer expands in response to less than predetermined maximum tension in the bolt. The pivot member will be axially spaced a known distance from the plate when the tension in the bolt is equal to the predetermined acceptable minimum tension. An elongated indicating member, or flag, is pivotally mounted at one end thereof to the pivot member.

17 Claims, 25 Drawing Figures

FIG. 10A  FIG. 10C  FIG. 10E
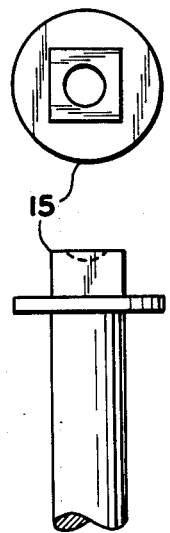 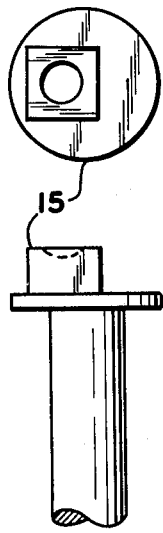 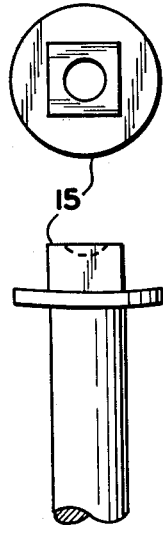
FIG. 10B  FIG. 10D  FIG. 10F
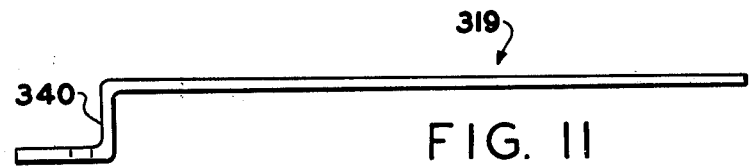
FIG. 11
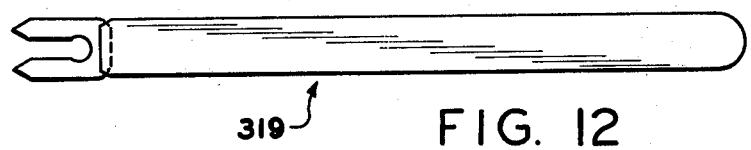
FIG. 12
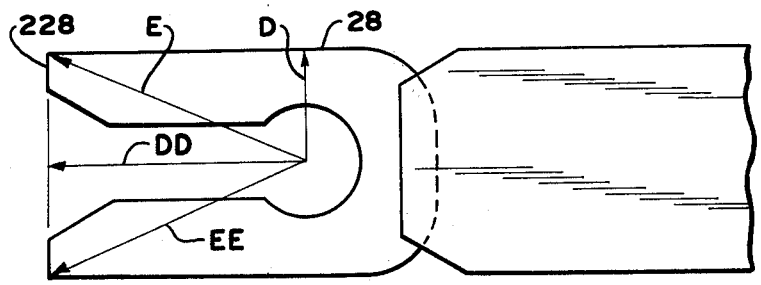
FIG. 12a

MINE BOLT TENSION INDICATOR

BACKGROUND OF THE INVENTION

1. Field of the Invention

This invention relates to tension indicating devices and more particularly relates to devices for visually indicating the tension in mine roof bolts which are also known as mine wall bolts, rock bolts and the like.

2. Description of the Prior Art

The art of roof bolting in mining tunneling and so on is well known and widely practiced. It is equally well known that the efficacy of the system depends upon the maintenance of the tension in the bolts in a predetermined range, that is at less than a predetermined maximum and at greater than a predetermined minimum acceptable tension.

At installation, the use of a torque wrench is some assurance that the bolt is initially in proper tension condition, although even this is not sure because of various imponderables such as variations in the screwthreading and in friction losses. However, even if the initial tension is correct, it will not necessarily remain so. It is noted that the United States Department of the Interior, Mine Enforcement and Safety Administration, indicates that the prime cause of accidental deaths in mines is the failure of mine roofs and/or ribs.

It is important from the point of view of safety and the general well-being of the mine that variations in tension outside of a permitted range be detected and corrected. This involves periodic inspection of the bolts, which are usually not easily accessible and often all but invisible. These and other difficulties have detracted from the value of known indicating devices.

The prior art includes several devices for indicating the tension in mine roof bolting. These devices may be seen by reference to U.S. Pat. Nos. 2,464,152; 3,104,645; 3,169,440 and 3,329,058. These devices are not totally satisfactory and have not found univeral or wide use because they were not passive and easily seen from a distance, they indicated over or under tension only, they were complicated and expensive to produce and/or install and/or they required electronic apparatus. More recent prior art devices have utilized chemical substances which change color as the tension in the bolt changed. These devices have also been found to be less than totally satisfactory as they are relatively expensive and/or difficult to see.

It is noted that at the present time, the most common mine bolt tension testing and monitoring system comprises a highly paid employee who manually tests mine bolts with a torque wrench.

SUMMARY OF THE INVENTION

In accordance with the present invention, the drawbacks of the prior art have been overcome to the extent that a relatively simple and inexpensive device is provided for visually indicating the tension in a mine roof bolt or the like. The device may be permanently installed for passive monitoring of the bolt or may include a removable indicating means to prevent tampering therewith and/or unintentional damage thereto. The device of the present invention has an indicating member which may assume a first position corresponding to greater than predetermined maximum tension in the bolt, a second position corresponding to less than predetermined acceptable minimum tension in the bolt or positions intermediate the first and second positions corresponding to a tension in the bolt intermediate the predetermined maximum and predetermined acceptable minimum.

The above is accomplished by providing a spring washer, preferably a helical washer, which is inserted inbetween the head of the bolt and the backing plate, or other member, against which the head will bear as the bolt is tightened. The spring washer will have an expanded condition, corresponding to no compression thereon and a flattened fully compressed condition corresponding to the compression exerted thereon by the bolt head and the plate when greater than the predetermined maximum tension is in the bolt. A pivot member, preferably a pivot pin or pivot aperture, is located on an exterior surface of the washer. The pivot member will be axially spaced a first distance from the plate when the washer is fully compressed and will be axially spaced a second distance from the plate when the washer is subjected to a compression equaling the predetermined acceptable minimum tension in the monitored bolt.

A highly visible elongated indicating member, or flag, is pivotally mounted at one end thereof, permanently or removably, to the pivot member. The free end of the indicating device, under the influence of gravity, will tend to pivot downwardly such that the indicating device would assume a vertical position. The indicating member, in a substantially horizontal or first position, has a surface which will engage the plate when the washer is fully compressed to maintain the indicating member in the first position. The surface has an outer extremity on the one end thereof which is spaced from the point at which the indicating member is pivotally mounted by a distance equal to or less than the axial separation of the pivot member from the plate when the washer is subject to a compression equal to the minimum allowable tension in the bolt. Thus, as the washer expands moving the pivot member away from the plate, the surface of the indicating member will gradually disengage the plate allowing the indicating member to angle away from its first, substantially horizontal position, until the surface totally disengages the plate and the indicating member hangs vertically in its second indicating position.

Accordingly, it is an object of the present invention to provide a new and improved device for visually indicating the tension in a mine roof bolt or the like.

Another object of the present invention is to provide a relatively simple and economical mechanical device for visually indicating if a mine roof bolt or the like is subject to greater than a predetermined maximum tension, less than predetermined minimum acceptable tension, or a tension greater than the predetermined minimum acceptable but less than the predetermined maximum.

These and other objects and advantages of the present invention will become apparent from a reading of the detailed description of the preferred embodiment taken in connection with the attached drawings.

3

Figure 3:
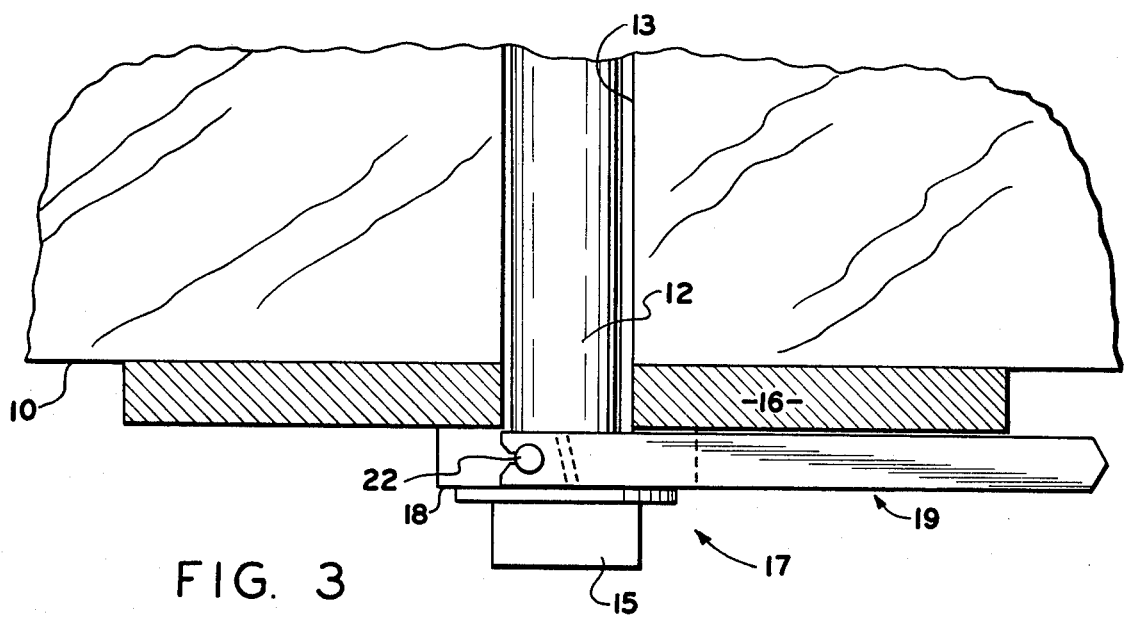

FIG. 3 is an enlarged view of the tension indication device of the present invention.

Figure 4:
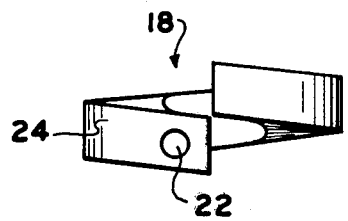

FIG. 4 is a front elevational view of the spring washer utilized in connection with the present invention.

Figure 5:
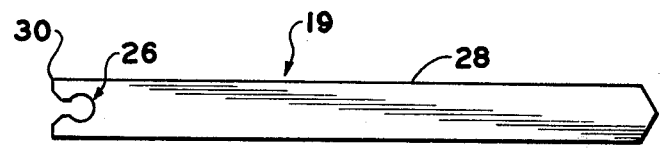

FIG. 5 is a front elevational view of the indicating device utilized in connection with the present invention.

Figure 5A:
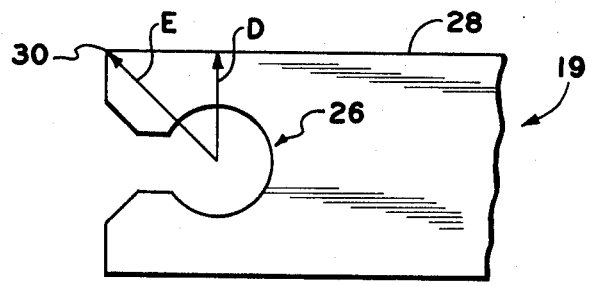

FIG. 5A is an enlarged fragmentary view of the indicating member of FIG. 5.

Figure 6:
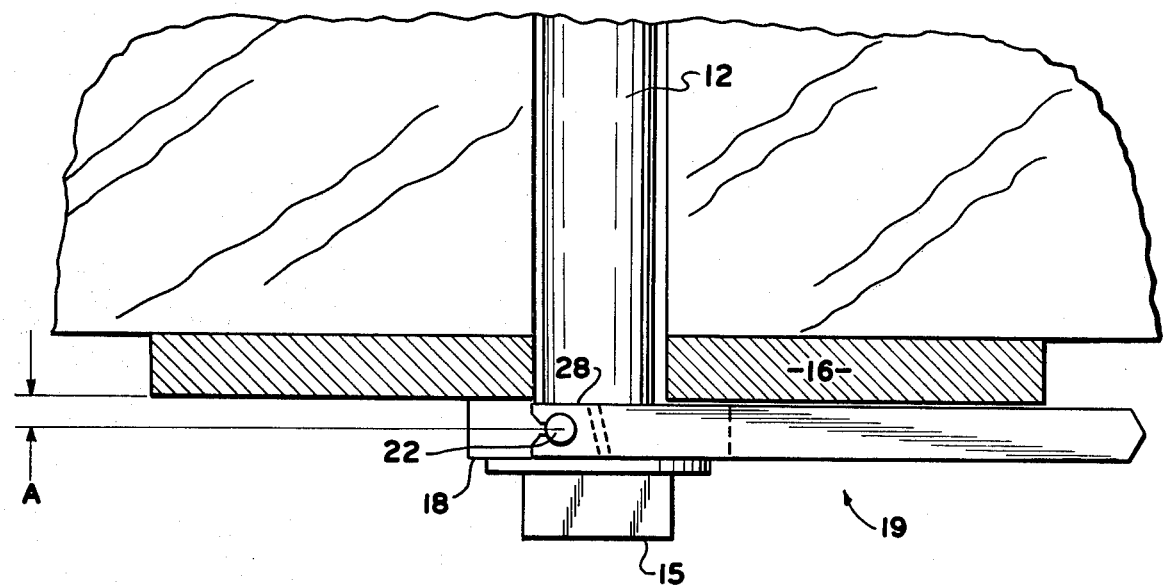

FIG. 6 is an enlarged view of the tension indicating device of the present invention indicating that the tension in a monitored mine roof bolt is equal to or greater than a predetermined maximum tension.

Figure 7:
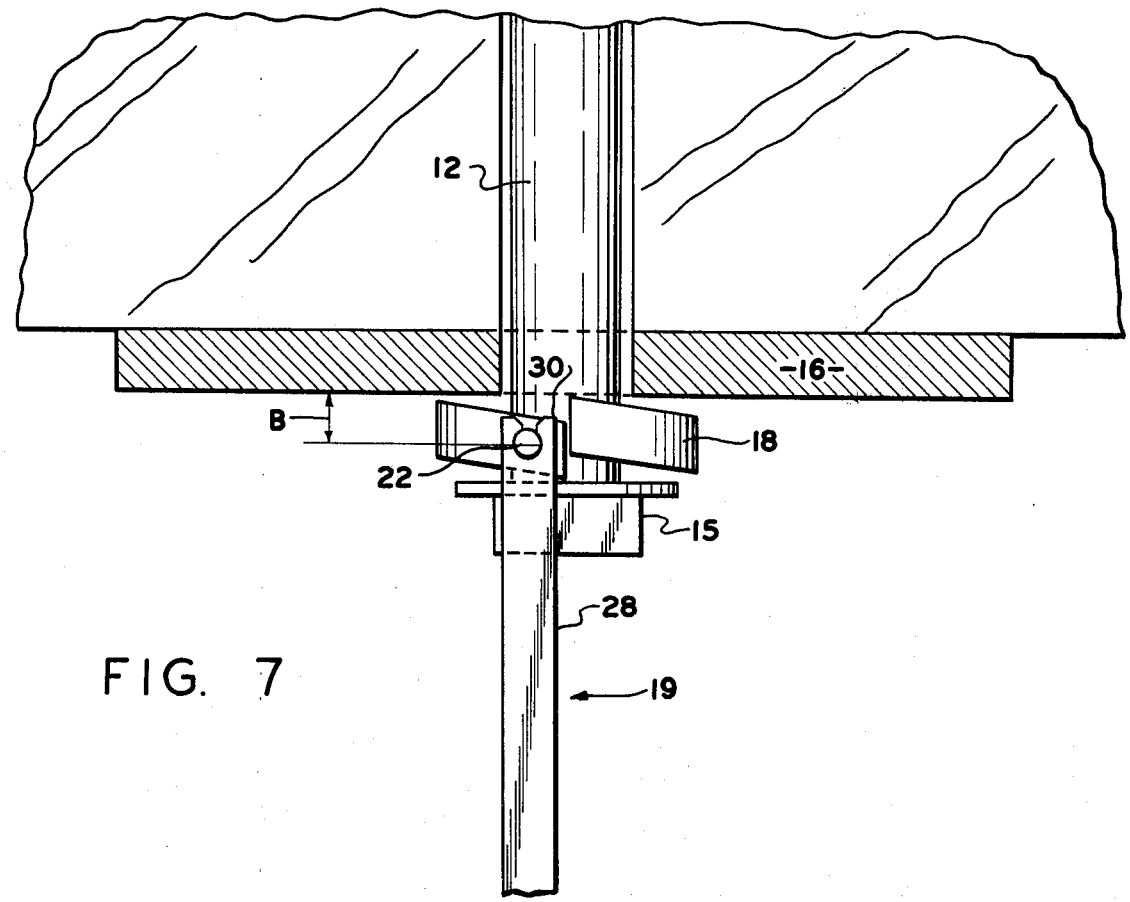

FIG. 7 is an enlarged view of the tension indicating device of the present invention indicating that the tension in a monitored mine roof bolt is less than a predetermined acceptable minimum tension.

Figure 8:
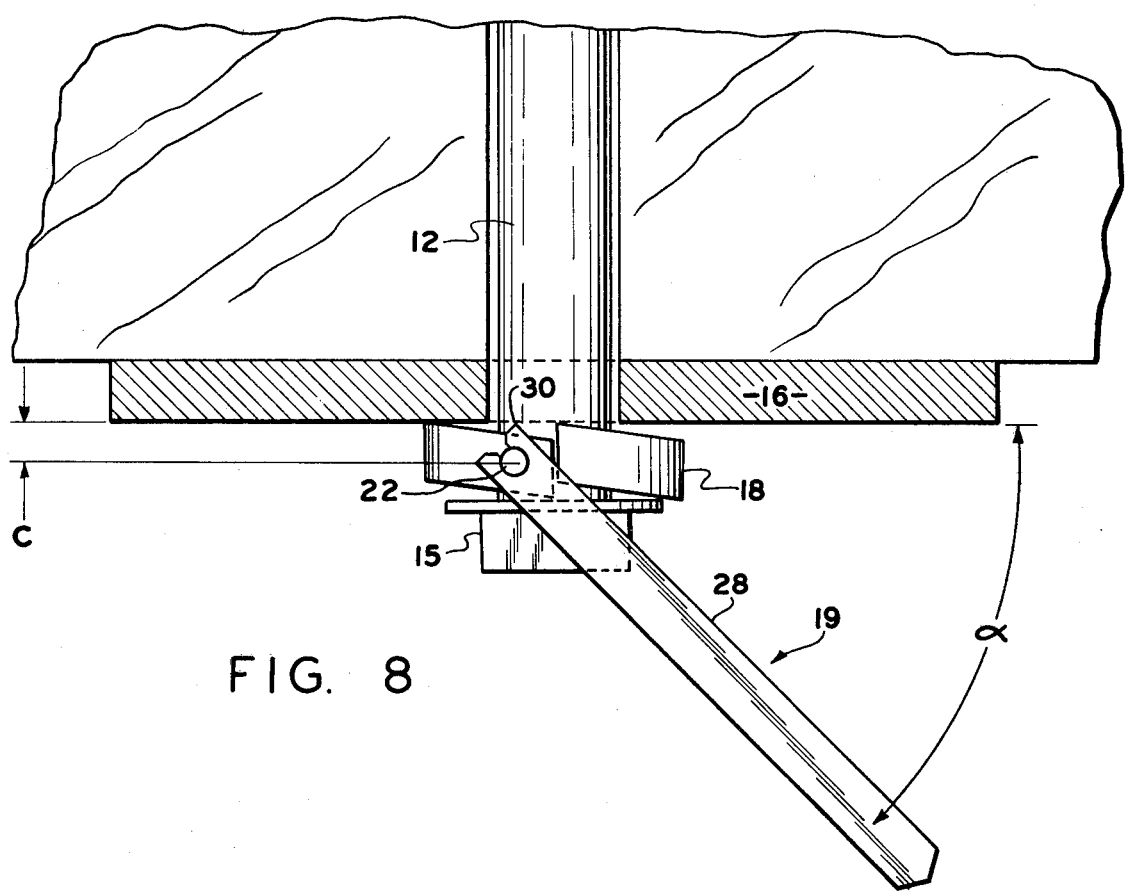

FIG. 8 is an enlarged view of the tension indicating device of the present invention indicating that the tension in a monitored mine roof bolt is greater than the predetermined acceptable minimum but less than the predetermined maximum tension.

Figure 9A:
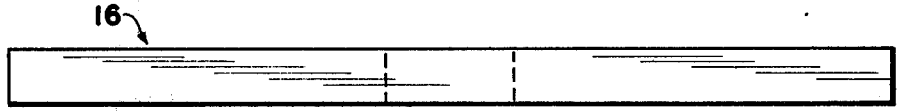
Figure 9B:
Figure 9C:
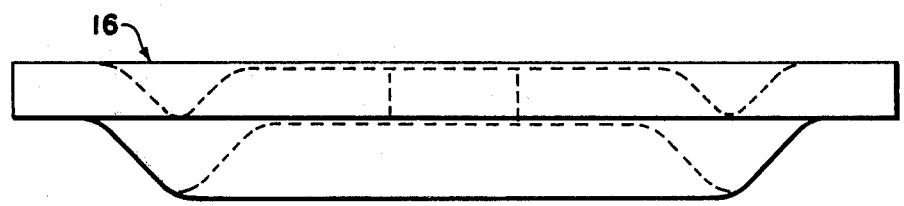

FIGS. 9A, 9B and 9C are cross-sectional views of three of the most commonly used mine roof backing plates.

FIGS. 10A, 10B, 10C, 10D, 10E and 10F are top and side views of conditions commonly encountered in mine roof bolt heads.

FIG. 11 is a top view of an alternate embodiment of tension indicating member.

FIG. 12 is a side elevational view of the tension indicating member of FIG. 11.

FIG. 12A is an enlarged fragmentary view of the indicating member of FIG. 12.

Figure 13:
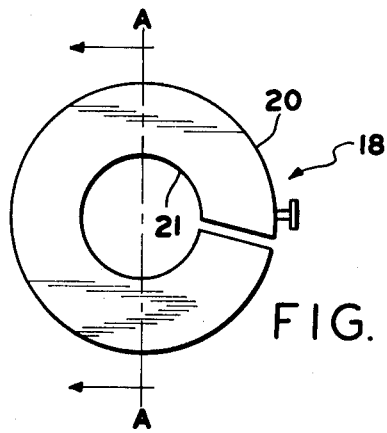

FIG. 13 is a top view of the helical spring washer of the present invention.

Figure 14:
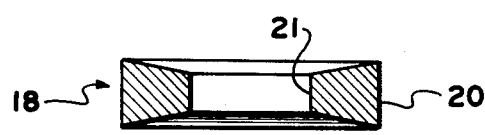

FIG. 14 is a sectional view of the helical spring washer of the present invention taken along line A-A in FIG. 13.

Figure 15:
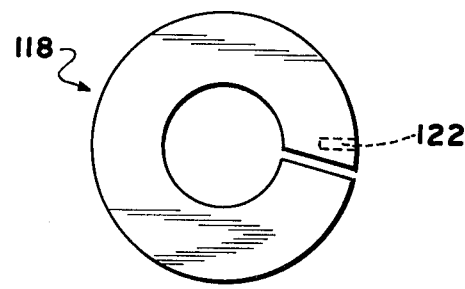

FIG. 15 is a top view of an alternate embodiment of the helical spring washer of the present invention.

Figure 16:
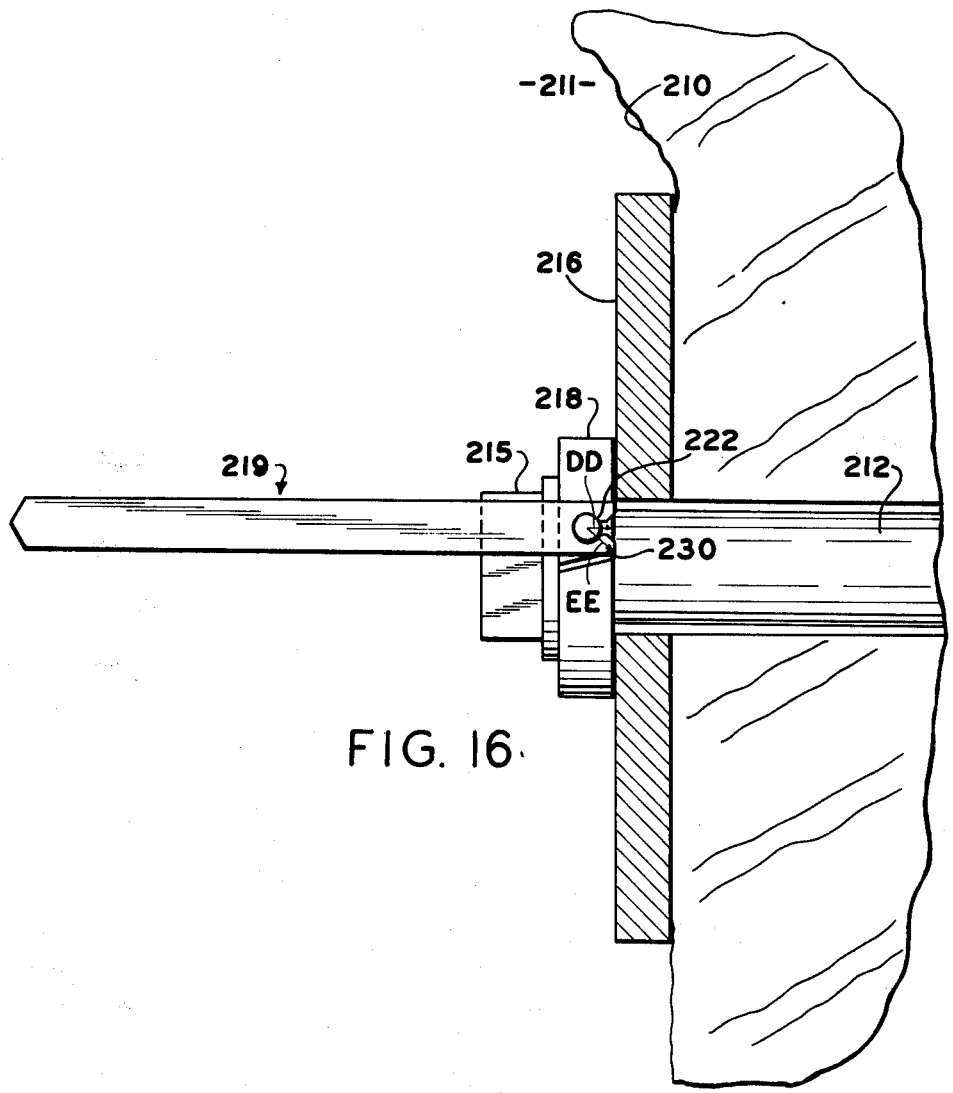

FIG. 16 is an alternate embodiment of the tension indication device of the present invention.

DESCRIPTION OF THE PREFERRED EMBODIMENT

Figure 1:
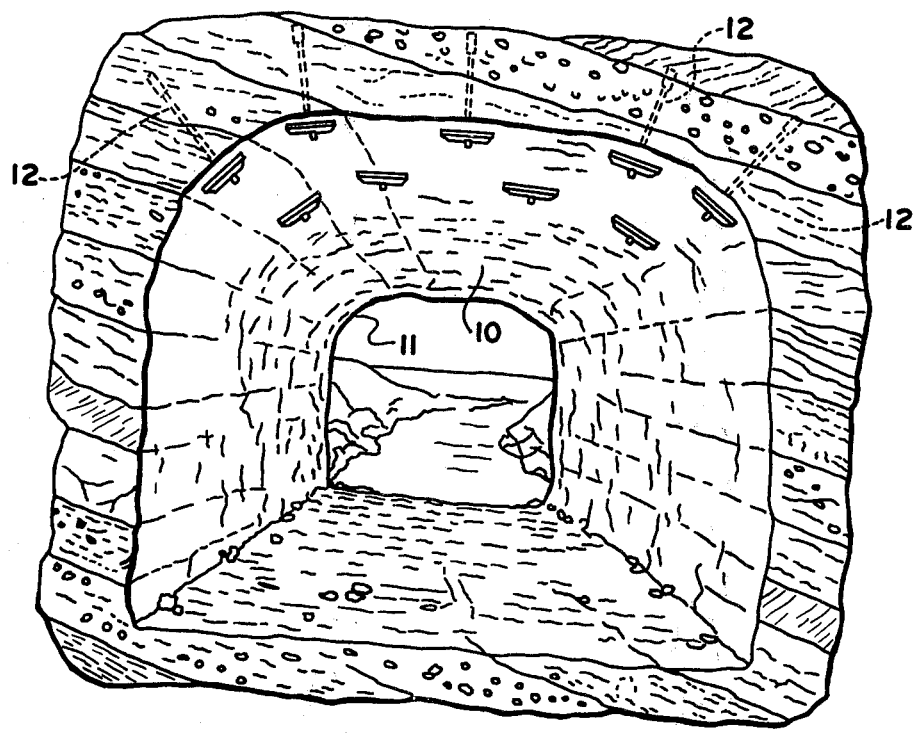
FIG. 1 is a perspective view of a portion of a mine tunnel showing representative "mine roof" or "rock" bolts in position to support the roof.

Referring now to FIG. 1 it will be seen that the roof 10 of a mine tunnel 11 may be supported by a plurality of "rock" or "mine roof" bolts generally bearing the reference character 12. Such bolts are generally ⅝ inch or ¾ inch in diameter and are 3½ feet to 6 feet in length. In order for these rock bolts to adequately perform their task it is necessary that the bolts be tightened to the prescribed tension and that they be maintained at this tension at all times.

Figure 2:
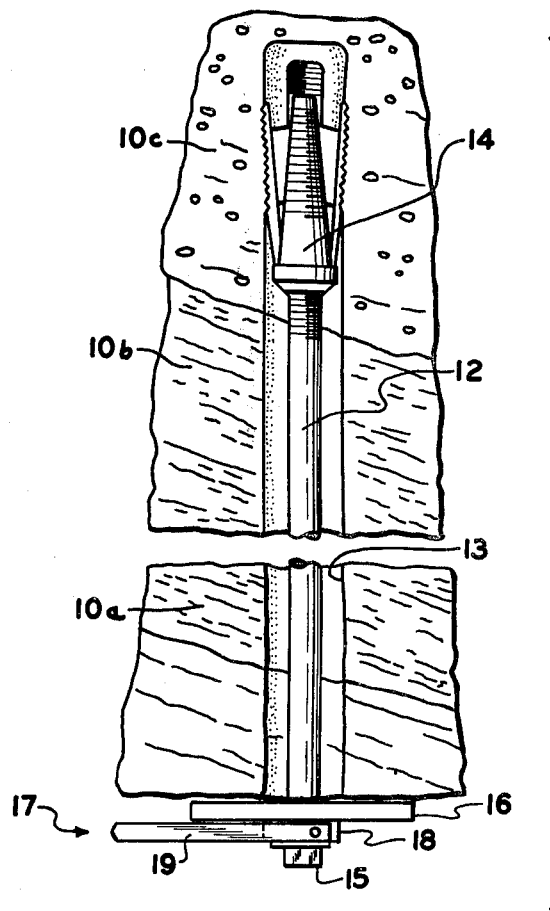
FIG. 2 is a enlarged cross-section showing one of the mine roof or rock bolts in FIG. 1 and illustrating the tension indicating device of the present invention.

In FIG. 2, a typical rock bolt 12 is shown installed in a drilling 13 formed in the rock strata and extending upwardly from the surface of the roof 10. An expansion shell 14 is provided at that end of the rock or mine roof bolt 12 which lies within the drill-line 13. The expansion shell 14 may be of any suitable construction and forms no part of the present invention. In general, expansion shells are constructed so that as tension is applied to the bolt, the shell will expand radially outwardly to grip the walls of the drilling 13 and to hold the bolt firmly within the drilling. A mine roof backing plate 16 is typically interposed the head 15 of the bolt 12 and the roof 10 of the mine tunnel. Of course, the head 15 of the bolt may be replaced by a threaded end and nut construction as is well known in the art and the term "bolt" as used herein is intended to encompass such construction. The indication device 17 of the present invention, to be discussed in greater detail below, is interposed the head 15 of the bolt 12 and the plate 16. It is understood the terms "backing plate" or "plate" will apply to the surface against which the bolt and/or indication device bears. Briefly, the indication device comprises a resilient, spring washer 18 and an indication member 19 pivotally mounted to the washer 18. As the head 15 of the bolt 12 is rotatingly advanced towards the expansion shell 14, the bolt 12 will be placed in tension and the rock strata 10a, 10b and 10c constituting the roof 10 will be placed in compression. As this occurs, the spring washer 18 is resiliently compressed, or flattened, between the plate 16 and head 15 of the bolt 12.

The tension indication device, 17, of the present invention may be seen in greater detail by reference to FIGS. 3–5. In FIG. 3, the mine roof bolt 12 is shown as received in a drilling 13 in the rock strata and retained by an anchor or expansion member (not shown) of conventional type. A backing plate 16 is utilized to provide a large bearing surface for the bolt against the mine roof 10. The tension indication device 17 is interposed the head 15 of the bolt 12 and the backing plate 16. The indicating device 17 comprises a spring washer 18 and an indicating member 19 which may be seen by reference to FIGS. 4 and 5 respectively. The washer 18 is interposed the head 15 of the bolt 12 and the backing plate 16. As is well known, the tension in bolt 12 will correspond to the compression between the head 15 of the bolt 12 and the backing plate 16. The spring washer 18 is thus subject to a compression equal to the tension in bolt 12 and a measurement of the compression in the washer 18 will provide an equally accurate measurement of the tension in bolt 12.

The spring washer 18 illustrated is a helical washer having a spring constant which allows the washer to become substantially fully compressed and flattened, FIG. 3 and FIG. 6, upon the application of a compressive force equal to at least the predetermined maximum tension in the bolt 12. It is appreciated that any type of spring washer having sufficient resiliency and spring constant may be utilized. The spring washer in its fully uncoiled, uncompressed condition is illustrated in FIG. 4. The preferred helical spring washer, see FIGS. 14 and 15, is specially configured to be thicker at its outer radius 20 than at its inner radius 21 to present a uniform outer bearing surface against the bolt head 15 and the backing plate 16 may bear. The spring washer is selected with a spring constant such that the washer will be somewhat compressed when subject to a compression equal to the predetermined minimum acceptable tension in the bolt.

A pivot member or pin 22 is provided on a radially outer surface 24 of the washer 18. The pivot member is preferably a pivot pin and may be a screw, rivet, welded shaft, staked shaft or the like. As may be seen by reference to an alternate spring washer 118 in FIG. 15, the pivot member 122 may also be a pivot bore for rotatably receiving a pivot pin. As may be seen by reference to FIG. 6, when the washer is fully compressed, i.e., subject to a compression equal to or greater than the predetermined maximum tension in bolt 12, the pivot pin 22 will be spaced from the backing plate 16 by a first distance A. As may be seen by reference to FIG. 7, which illustrates the tension indication device 19 of the present invention indicating less than predetermined minimum acceptable tension in bolt 12, when the washer is subject to a compression less than the predetermined minimum acceptable tension in the bolt, the washer expands and pivot pin 22 is spaced by at least a known second distance B from the backing plate 16. Of course, when the washer is subject to a compression less than the predetermined maximum but greater than the predetermined minimum tension in bolt 12, the pivot pin 22 will be spaced from the plate 16 by a distance C which is greater than distance A but less than distance B, see FIG. 8.

The indicating member 19 is an elongated body which is provided with a pivot mount 26 at one end thereof. The pivot mount 26 is designed to engage the pivot member 22 of washer 18 to pivotally mount the indication member 19 to the washer 18. Indication member 19 may be designed for relatively permanent or for relatively easily removable mounting to the washer 18. The indication member 19 is preferably large and easily visible from a distance. The indication member 19 may be molded or stamped of a luminous plastic or may be a metallic device with a luminous coating thereon.

The indication member 19 has a surface or face 28 for engagement with the backing plate which is spaced from the pivot mount by a distance D which is generally equal to distance A. The extremity 30 of face 28 at the end of the indicating member at which it is pivotally mounted to the washer 18 is separated from the pivot mount by a distance E which is generally equal to distance B. Face 28 may, of course, be continued.

The operation of the indicating device 17 may be seen by reference to FIGS. 6–8. In FIG. 6 the spring washer 18 is fully compressed, the pivot pin 22 is spaced from the backing plate by distance A and face 28 of indicating member 19 is pressed against the backing plate 16 maintaining the indicator 19 in a generally horizontal or first position indicating that greater than the predetermined tension is in monitored bolt 12.

In FIG. 7, the washer 18 is expanded or uncoiled by a degree sufficient to move pivot pin 22 a distance at least as great as distance B from the backing plate 16. The indicating device is hanging vertically, or in a second position indicating less than predetermined minimal acceptable tension in bolt 12, as both face 28 and extremity 30 have been disengaged from the backing plate 16.

In FIG. 8, the washer 18 has expanded or uncoiled by a degree sufficient to move pivot pin 22 a distance C from the backing plate 16. The extremity 30 of the face 28 of the indicating member 19 is engaged by the backing plate 16 and the indicating member 19 hangs at an angle $\alpha$, generally between 5° and 70°, with respect to the horizontal indicating that the tension in bolt 12 is greater than the predetermined acceptable minimum but less than the predetermined maximum. The indicating device in FIG. 8 is thus visually indicating that the tension in monitored bolt 12 is within an acceptable range.

Of course, by selective variation of the spring constant of washer 18, i.e., of distances A, B and C, and/or by selective variation of the one end of indication member 19, i.e., distances D and E, the indication device 17 of the present invention may be selected to indicate tension conditions in a bolt 12 over a selectively variable range.

In FIG. 16, an alternate embodiment 217 of the invention is illustrated. In this embodiment the bolt 212 is driven into a substantially vertical wall 210 of the mine tunnel 211. The spring washer 218 and bolt 212 and plate 216 are identical in function to washer 18, bolt 12 and plate 16 described above.

The indication member 219 is generally identical to indicator member 19 described above except that an end or vertical face 228 is designed to contact the plate 216 when the indication member is in the first or substantially horizontal position. With the exception of the location of surface 228, the indicator 217 is identical in function to indicator 17 described above and will not be described in greater detail.

FIG. 9 illustrates three types of commonly used backing plates. FIG. 10 illustrates the non standard conditions often found in connection with the heads of mine roof bolts. An alternate embodiment of the indication member 319, designed for use with the various types of backing plates and bolt heads, is illustrated in FIGS. 11 and 12. As may be seen in FIG. 12, the indication member 319 may be utilized for mine roof or side wall applications. The indication member 319 is substantially identical to indication members 19 and 219 described above except that the free end of elongated body is offset the end at which to indicating member is pivotally mounted by a stepped portion 340. The stepped portion 340 allows the body to clear and be uneffected by the various types of backing plates and/or non-standard bolt heads.

Although this invention has been described in its preferred forms with a certain degree of particularity, it is understood that the present disclosure of the preferred forms is by way of example only and that numerous changes to the details of construction and arrangement of the parts may be resorted to without departing from the spirit and the scope of the invention as hereinafter claimed.

I claim:

1. A mechanical device for visually indicating the tension in a monitored bolt or the like, said device comprising:

a helical spring washer inserted inbetween the head of the bolt and the surface against which the bolt head bears substantially resilient compression therebetween, said washer being fully compressed between the head of the bolt and the surface when tension in the bolt exceeds a predetermined maximum and being at least somewhat compressed between the head of the bolt and the surface when tension in the bolt equals a predetermined acceptable minimum, said washer having a pivot member on a radially outer surface thereof, said pivot member being spaced from the surface against which the bolt head bears by a first distance when said washer is fully compressed and spaced from said surface against which the bolt bears by a second distance, greater than said first distance, when the washer is compressed between the bolt head and the surface by the tension in the monitored bolt equalling a predetermined acceptable minimum; and an elongated indicating member pivotally mounted at one end thereof to said washer, said indicating member having a pivot mount for cooperation with said pivot member to mount said indicating member to said washer, said indicating member having a face for engagement with said surface, said face being spaced from said pivot mount by a distance generally equal to said first distance, said face having an outer extremity at said one end thereof spaced from said pivot mount by a distance generally equal to said second distance.

2. The device of claim 1 wherein said washer is thicker at its radially outer circumference than at its radially inner circumference.

3. The device of claim 1 wherein said pivot member is a pin extending radially outwardly from the radially outer surface of said washer and said pivot mount is a bore for receiving said pin.

4. The device of claim 3 wherein said pin is welded to said washer.

5. The device of claim 3 wherein said pin is threadably attached to said washer.

6. The device of claim 1 wherein said pivot member is a bore opening to the radially outer surface of said washer and said pivot mount comprises a pin adapted to be pivotally received in said bore.

7. The device of claim 1 wherein said indicating member includes a highly visible, luminous portion.

8. The device of claim 7 wherein said indicating member is a one-piece, molded part of a luminous plastic.

9. The device of claim 7 wherein said indicating member is a one-piece part stamped from a sheet of luminous plastic.

10. The device of claim 7 wherein said indicating member is a metallic part having a coating of luminous material.

11. The device of claim 7 wherein said indicating member has a free end opposite said one end which is generally parallel to said one end, said one end and said free end being joined by a bight portion which is generally perpendicular to said one end.

12. A mechanical device for indicating the tension in a monitored bolt or the like, said device comprising:
a helical spring washer interposed the head of the bolt and a bearing surface, said washer being resiliently compressible between said head and said surface, said washer being less than fully compressed between said head and said surface when said bolt is at a predetermined minimum acceptable tension, said washer having a pivot member thereon which is spaced from said surface by a known distance when said washer is compressed between said head and said surface by a tension in said bolt equal to said predetermined minimum acceptable tension; and
an elongated indicating member pivotally mounted at one end thereof to said washer, said elongated indicating member having a pivot mount about which the indicating member is pivotally mounted to said pivot member, said indicating member having an outer extremity at said one end thereof for engagement with said surface, said extremity spaced from said pivot mount by a distance generally equal to said known distance.

13. The device of claim 12 wherein said helical washer, when fully compressed, is thicker at its radially outer circumference than at its radially inner circumference.

14. The device of claim 12 wherein said indicating member is removably pivotably mounted to said washer.

15. The device of claim 12 wherein at least a portion of said indicating device is comprised of a luminous substance.

16. A mechanical device for visually indicating if the tension in a monitored bolt or the like is within a predetermined range defined by a predetermined maximum tension and a predetermined minimum acceptable tension, is greater than the predetermined maximum tension or is less than the predetermined minimum acceptable tension, said device comprising:
a helical spring washer interposed the head of the monitored bolt and a bearing surface for resilient compression therebetween, said washer having a spring constant such that the washer will be substantially fully compressed and flattened when subject to a compression equal to said maximum tension and will be only somewhat compressed when subject to a compression equal to said minimum tension, said washer having a pivot member on a radially outer surface thereof, said pivot member spaced a first distance from said surface when said washer is fully compressed against said surface and spaced a second distance, greater the said first distance, from said surface when said washer is compressed between said head and said surface by a compression equal to said minimum tension; and
an elongated indicating member pivotably mounted at one end thereof by a pivot mount about which said indicating member pivots to said pivot member on said washer, said indicating member having a face for engagement with said surface which is spaced from said pivot mount by a distance generally equal to first distance, said face having an outer extremity on said one end which is spaced from said pivot mount by a distance generally equal to said second distance, said one end of said elongated indicating member being generally rectangular in cross-section and said extremity comprising a corner of said rectangular cross-section.

17. The device of claim 16 wherein at least a portion of said indicating member is of a luminous material.

* * * * *

UNITED STATES PATENT AND TRADEMARK OFFICE
CERTIFICATE OF CORRECTION

PATENT NO. : 4,000,681
DATED : January 4, 1977
INVENTOR(S) : Chester P. Coldren

It is certified that error appears in the above-identified patent and that said Letters Patent are hereby corrected as shown below:

Col. 4, line 65
delete "equal to or".

Col. 5, line 9
before "less" insert -- equal to or --.

Col. 5, line 9
before "greater" insert -- equal to or --.

Col. 5, line 57
before "greater" insert -- equal to or --.

Col. 5, line 58
after "but" insert -- equal to or --.

Claim 16, Column 8, line 28 (claim 18, line 11 of the application), delete "equal to" and insert -- greater than -- therefor.

Signed and Sealed this

Thirteenth Day of March 1979

[SEAL]

Attest:

RUTH C. MASON
Attesting Officer

DONALD W. BANNER
Commissioner of Patents and Trademarks